Patented Sept. 30, 1941

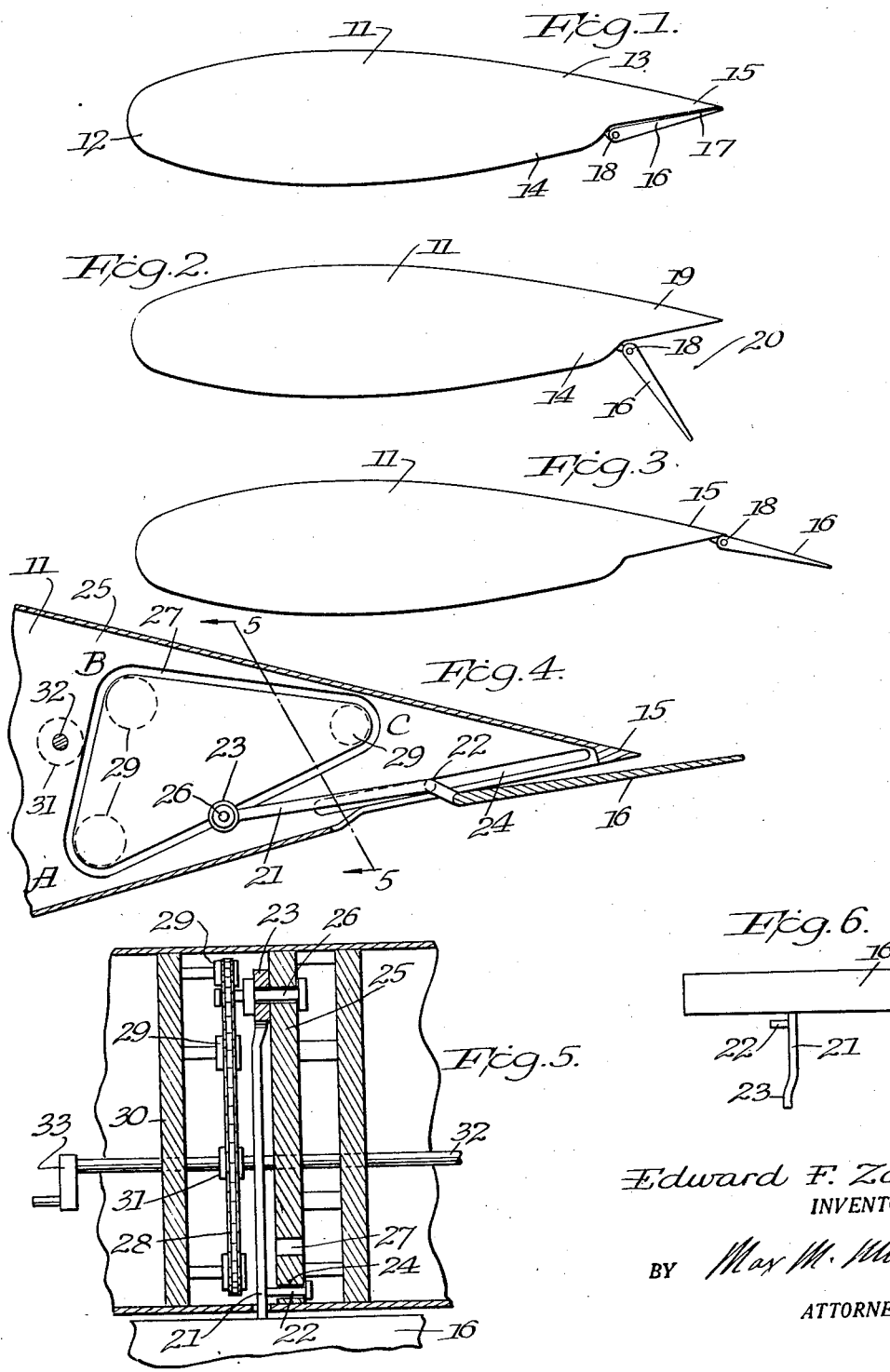

2,257,215

UNITED STATES PATENT OFFICE 2,257,215

SPLIT FLAP

Edward F. Zap, West Chester, Pa.

Application February 10, 1938, Serial No. 189,851

5 Claims. (Cl. 244—42)

This invention relates to a so-called split flap, which is a flap hinged at its forward edge to the bottom of an airplane wing, extending substantially parallel to the trailing edge of the wing immediately in front thereof.

It is the principal object of this invention to provide for a split flap by means of which the lift capacity of the wing can either be increased in association with the creation of a large drag, or the lift capacity can be increased in association with a moderate drag increase, so that the novel flap is suitable for improving the landing, the take off and the cruising performance of the airplane. A pair of such flaps can also be used to take the place of the conventional ailerons.

These objects are obtained by the particular manner of moving the split flap relative to the wing. The leading edge of the flap is shifted along the bottom side of the wing in a substantially chordwise direction, and at the same time the flap is turned about that edge.

These and other desirable objects and advantages of the present invention will be illustrated in the accompanying drawing and described in the specification, certain preferred embodiments being disclosed for illustration only; for, since the underlying principles may be incorporated in other specific devices, it is not intended to be limited to the ones here shown except as such limitations be clearly imposed by the appended claims.

In the drawing like numerals refer to similar parts throughout the several views, of which Figs. 1, 2, and 3 represent a wing profile with the split flap at different characteristic positions, Fig. 4 represents a vertical and chordwise cross section through the trailing edge of the wing, showing a mechanism suitable for moving the split flap in the novel manner, Fig. 5 represents a spanwise and substantially vertical cross section through the wing of Fig. 4, on the line 5—5, and Fig. 6 represents a top view of the split flap of Figs. 4 and 5.

In Fig. 1 there is shown the split flap 16 in closed or retracted position, giving to the composite wing section a small lift capacity and a small drag, whereby it becomes suitable for good performance at high flying speed. The composite wing section Fig. 1 composed of airfoil 11 and flap 16 is a symmetric double cambered section, having a rounded leading edge 12, equal convex upper and lower camber lines 13 and 14, and a sharp trailing edge formed of the sharp trailing edge 15 of the stationary airfoil 11 and the sharp trailing edge 17 of the flap 16, adjacent to 15. In the position Fig. 1 the flap 16 is along its entire rear surface in contact with the lower surface of the airfoil. The forward edge 18 of the flap is spaced from the trailing edge 15 of the airfoil.

In Fig. 2, the flap is shown in its high lift and high drag position. The leading flap edge 18 is in contact with the lower airfoil surface 14 at its rear along a line substantially parallel to the trailing airfoil edge 15. The flap forms the angle 20 with said surface 14 open to the rear.

In Fig. 3, the flap is shown in its high lift and small drag position. The leading flap edge 18 is adjacent the trailing airfoil edge 15 and in contact with the lower surface 14, and the flap and the upper airfoil surface 13 in an almost continuous or unbroken direction. The composite contour formed by the flap and the airfoil in position Fig. 3 is not double cambered, but convex at the top side and hollow or concave in rear at the bottom side.

In Fig. 4 there is shown flap 16 having an extension rod 21 with a projection 22 and an eye 23. Projection 22 is in sliding contact with and within a slot 24 of rib 25 of the airfoil, said slot being parallel to and adjacent the lower rear portion 14 of the airfoil surface. A bolt 26 passes through the eye 22, said bolt being within and in sliding contact with a slot 27 of rib 25. The slot 27 is of triangular shape with rounded corners. Bolt 26 is furthermore fastened to and driven by a chain 28 positioned adjacent slot 27 and mounted on wheels 29 mounted in their turn on a rib 30 of the airfoil. Chain 28 may be driven by the control shaft 32 through a sprocket wheel 31 mounted thereon, the shaft being supported by bearings fastened to the airfoil structure. Shaft 32 can be turned by the pilot, as schematically indicated by crank 33. Any suitable kind of drive, direct or gear chain members interposed, energized or not, mechanical, electrical, or hydraulic, is contemplated.

As control shaft 32 is turned, in one direction or the other, flap 16 is moved from any one of the positions Fig. 1, 2, or 3, to any other one through intermediate positions. It will readily be seen that the leading edge 18 remains always close to and in contact with the lower surface 14. Letters A, B and C indicate the positions of the bolt 26 corresponding to the flap positions Figs. 1, 2 or 3 respectively. Since the shaft 32 may be turned in either direction, it is possible to move the bolt from any corner of the triangular slot 27 to any other corner without passing through the third corner. The bolt can for instance be moved from A to C without passing through position B. In consequence, the flap may be moved from any position Fig. 1, 2, or 3 to any other one directly. This feature is preferred, but not indispensible for all airplanes. Portion B—C of the slot 27 may be omitted.

While, for clearness' sake only one rod 21 is shown, it has to be understood that several ones may be preferable to give sufficient rigidity to the flap. The mechanism of Figs. 4 and 5 would then be correspondingly duplicated, and several wheels 31 mounted on shaft 32. Any plurality of split flaps of the kind described may be installed at the trailing portion of the airfoil; the number is not restricted to one. Several ones may be controlled in unison or independently of each other. They may also be controlled interlinked but moving differently at the same time, similar to the conventional aileron motion.

I claim:

1. The combination with an airfoil, of a rearwardly disposed substantially spanwise extending flap associated with the pressure side of said airfoil, a guiding mechanism in the airfoil for said flap, attachment means on said flap engaging said guiding mechanism, said guiding mechanism including first guiding means constructed and arranged to guide the flap in movement from a first position in which the flap is spaced from and below the trailing edge of the airfoil, its leading edge being adjacent the lower surface of the airfoil, and the flap and the airfoil forming an angle open to the rear, into a second position in which the leading edge of the flap is immediately adjacent the trailing edge of the airfoil and the upper side of the flap is flush with the upper side of the airfoil, and said guiding mechanism including furthermore second guiding means constructed and arranged to guide the flap in movement from said second position to a third position in which the lower side of the flap is flush with the lower side of the airfoil, and the trailing edges of the flap and of the airfoil are adjacent to each other, and unitary control means progressively operable to move the flap in the afore described guided relation along said guiding means.

2. The combination with an airfoil, of a rearwardly disposed substantially spanwise extending flap associated with the pressure side of said airfoil, a guiding mechanism in the airfoil for said flap, attachment means on said flap engaging said guiding mechanism, said guiding mechanism including first guiding means constructed and arranged to guide the flap in movement from a first position in which the leading edge of the flap is immediately adjacent the trailing edge of the airfoil and the upper side of the flap is flush with the upper side of the airfoil, into a second position in which the lower side of the flap is flush with the lower side of the airfoil, and the trailing edges of the flap and of the airfoil are adjacent to each other, and said guiding mechanism including furthermore second guiding means constructed and arranged to guide the flap in movement from said second position to a third position in which the flap is spaced from and below the trailing edge of the airfoil, its leading edge being adjacent the lower surface of the airfoil, and the flap and the airfoil forming an angle open to the rear, and unitary control means progressively operable to move the flap in the aforedescribed guided relation along said guiding means.

3. The combination with an airfoil, of a rearwardly disposed substantially spanwise extending flap associated with the pressure side of said airfoil, a guiding mechanism in the airfoil for said flap, attachment means on said flap engaging said guiding mechanism, said guiding mechanism including first guiding means constructed and arranged to guide the flap in movement from a first position in which the lower side of the flap is flush with the lower side of the airfoil, and the trailing edges of the flap and of the airfoil are adjacent to each other, into a second position in which the flap is spaced from and below the trailing edge of the airfoil, its leading edge being adjacent the lower surface of the airfoil, and the flap and the airfoil forming an angle open to the rear, and said guiding mechanism including furthermore second guiding means constructed and arranged to guide the flap in movement from said second position to a third position in which the leading edge of the flap is immediately adjacent the trailing edge of the airfoil, and the upper side of the flap is flush with the upper side of the airfoil, and unitary control means progressively operable to move the flap in the afore described guided relation along said guiding means.

4. The combination with an airfoil, of a rearwardly disposed substantially spanwise extending flap associated with the pressure side of said airfoil, a guiding mechanism in the airfoil for said flap, attachment means on said flap engaging said guiding mechanism, said guiding mechanism including first guiding means constructed and arranged to guide the flap in movement from a first position in which the flap is spaced from and below the trailing edge of the airfoil, its leading edge being adjacent the lower surface of the airfoil, and the flap and the airfoil forming an angle open to the rear, into a second position in which the leading edge of the flap is immediately adjacent the trailing edge of the airfoil and the upper side of the flap is flush with the upper side of the airfoil, said guiding mechanism including furthermore second guiding means constructed and arranged to guide the flap in movement from said second position to a third position in which the lower side of the flap is flush with the lower side of the airfoil, and the trailing edges of the flap and of the airfoil are adjacent to each other, and said guiding mechanism including furthermore third guiding means constructed and arranged to guide the flap in movement from said third position to said first position, and unitary control means progressively operable to move the flap in the afore described guided relation along said guiding means.

5. The combination with an airfoil of a rearwardly disposed substantially spanwise extending flap associated with the pressure side of said airfoil, a guiding mechanism in the airfoil for said flap comprising more than two drums in an ordinarily vertical plane, an endless chain mounted on and guided by said drums, a guide track in the airfoil substantially parallel to the rear portion of the lower wall of the airfoil, a rod projecting forwardly from and rigidly attached to the flap, means connecting the forward end of said rod to the chain, a projection on the rod in engagement with said track, and sprocket means in engagement with the chain for driving the same around said drums, whereby the flaps may be adjusted relative to the airfoil to produce changes in the lift and drag of the airfoil.

EDWARD F. ZAP.